United States Patent [19]

Nichols et al.

[11] Patent Number: 6,138,150

[45] Date of Patent: *Oct. 24, 2000

[54] METHOD FOR REMOTELY CONTROLLING COMPUTER RESOURCES VIA THE INTERNET WITH A WEB BROWSER

[75] Inventors: Stephen R. Nichols; Kurt N. Schroeder, both of Endicott; Samuel L. Wentz, Endwell, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,105

[22] Filed: Sep. 3, 1997

[51] Int. Cl.[7] .............................. G06F 15/16; G06F 13/38; G06F 15/17

[52] U.S. Cl. ........................... 709/219; 345/335; 345/348

[58] Field of Search .................................... 709/217, 219, 709/203, 208, 302, 218; 710/15, 18, 19, 220; 707/513; 395/101, 114; 345/326, 329, 330, 163, 335, 356, 348

[56] References Cited

U.S. PATENT DOCUMENTS

| | | |
|---|---|---|
| 5,204,947 | 4/1993 | Bernstien et al. ...................... 709/218 |
| 5,239,466 | 8/1993 | Morgen et al. . |
| 5,283,861 | 2/1994 | Dangler et al. . |
| 5,315,711 | 5/1994 | Barone et al. . |
| 5,349,675 | 9/1994 | Fitzgerald et al. ...................... 709/217 |
| 5,479,599 | 12/1995 | Rockwell et al. . |
| 5,483,631 | 1/1996 | Nagai et al. ............................. 709/224 |
| 5,497,463 | 3/1996 | Stein et al. . |
| 5,699,494 | 12/1997 | Colbert et al. .......................... 395/114 |
| 5,715,453 | 2/1998 | Stewart .................................... 709/218 |
| 5,727,135 | 3/1998 | Webb et al. ............................. 395/114 |
| 5,727,155 | 3/1998 | Dawson ................................... 709/217 |
| 5,742,759 | 4/1998 | Nessett et al. .......................... 709/219 |
| 5,761,421 | 6/1998 | Van Hoff et al. ....................... 709/223 |
| 5,761,656 | 6/1998 | Ben-Shachar ........................... 345/335 |
| 5,778,356 | 7/1998 | Heiny ......................................... 707/2 |

(List continued on next page.)

OTHER PUBLICATIONS

Brown, Mark; "Using Netscape 2", Que Corporation; ISBN:0–7897–0612–1; Entire book, especially pp. 166–191, 260–263, 280–288, 631–632, 836–850, Dec. 1995.

Howlett, Dennis; PC User Magazine, EMAP (UK); "Flexible Print control"; Jun. 26, 1996; n286; p70(1).

Beckman, Mel; MacWorld Magazine, MacWorld Communications Inc.; "LANScape SNMP 2.1"; Jul. 1996; v13; n7; p74(1).

*Primary Examiner*—Mark H. Rinehart
*Assistant Examiner*—Marc D. Thompson
*Attorney, Agent, or Firm*—Whitham, Curtis & Whitham; Arthur J. Samodovitz

[57] ABSTRACT

A personal computer or workstation running a Web browser point and click interface is used to display and send information for remotely controlling a computer such as a mainframe. In the preferred embodiment, a web site or "home-page" is constructed on a secure HTTP (hyper text transfer protocol) server which comprises a Hardware Management Console (HMC). A user logs on to the Internet World Wide Web in a conventional manner by entering the address or uniform resource locator (URL) to connect to the secure HTTP server. Upon entry of a correct password the Hardware Management Console (HMC) home-page will be displayed. Icons representing various mainframe computer components are displayed which link to additional pages which the user can click on to monitor and control the mainframe computer. The color of the icons provide a summary of the status its representative component (e.g., a green icon indicates that the representative component is functioning is normally, red indicates an abnormal condition, and blue indicates that a message is available). Further, the user can change an automatic refresh rate for the browser stored at the server for a particular user identification (userid). Any action initiated by a remote web browser is reflected on the local Hardware Management Console (HMC) drag and drop interface and vice-versa.

16 Claims, 16 Drawing Sheets

U.S. PATENT DOCUMENTS

| | | | |
|---|---|---|---|
| 5,801,689 | 9/1998 | Huntsman et al. | 709/208 |
| 5,801,707 | 9/1998 | Rolnik et al. | 345/429 |
| 5,802,530 | 9/1998 | Van Hoff | 707/513 |
| 5,805,442 | 9/1998 | Crater et al. | 709/219 |
| 5,812,826 | 9/1998 | McLain, Jr. | 385/500 |
| 5,845,299 | 12/1998 | Arora et al. | 707/513 |
| 5,847,957 | 12/1998 | Cohen et al. | 709/219 |
| 5,949,412 | 9/1999 | Huntsman | 345/329 |
| 5,956,036 | 9/1999 | Glaser et al. | 345/356 |

PERSONALIZED AUTOMATIC REFRESH PROCESS FLOW

F03 Details

Instance information

Status: Operating
Group: Defined CPCs

Activation profile: DEFAULT
Last used profile: not set via Activate

Last task information

Task-name:
Task status:

Acceptable status

- ☑ Operating
- ☐ Not operating
- ☐ No power
- ☐ Power save
- ☐ Exceptions
- ☐ Status check
- ☐ Communications not active
- ☐ Service

Product information

| | | | |
|---|---|---|---|
| Machine type – model: | 009672 – RX5 | SNA address: | IBMPS390.F03 |
| Machine serial: | 02 – 0043909 | Node id: | 05D – 03301 |
| Machine sequence: | 000000043909 | LAN address: | 0004AC5504A9 |
| Plant of manufacture: | 02 | Internet address: | 9.117.59.11 |
| Manufacturer: | IBM | CPC location: | A18A |
| CPC serial: | 000020043909 | CPC identifier: | 00 |

[ Save ]   [ Change Options ]   [ Return ]

FIG.10

METHOD FOR REMOTELY CONTROLLING COMPUTER RESOURCES VIA THE INTERNET WITH A WEB BROWSER

BACKGROUND OF THE INVENTION

1. Field of the Invention

The present invention generally relates to controlling a remote computing device through the Internet or other network and, more particularly, to monitoring and controlling a remote device such as, for example, a mainframe computer with a client running a Web browser connected to the Internet World Wide Web (WWW).

2. Description of the Related Art

The Internet comprises a vast network of heterogeneous computers and sub-networks all communicating together and allowing for the virtually unfettered global exchange of information. The World-Wide Web (WWW) is one of the most popular information services on the Internet. The WWW uses browser software to decipher hypertext links to other documents or files located on remote computers all of which are connected through the Internet. Browsers therefore provide a user-friendly graphical interface which allows users to easily navigate or .surf. from site to site or file to file around the Internet. Using a browser, a user can click on a highlighted word or words on their computer screen and instantly access related information in the form of text, audio, video, and pictures and related multimedia stored on remote computers or content servers. Browsers, in addition to allowing a user to "click" on a link to another page, also provide the ability for users to submit data to the server through the use of HTML "forms". Using forms, a user can send character data or choose one or more items from a predefined list, thus providing a two-way exchange of data between user and server.

FIG. 1 is a much simplified pictorial illustration of the Web 2 including a plurality of clients 4 and a plurality of content servers 6. The content servers 6 retrieve or generate data from associated databases 7. The clients 4 may be, for example, a personal computer or work station running a browser software package, such as, for example, NETSCAPE, or MS EXPLORER. The clients 4 may be connected directly to the Internet 8 or may connect to other clients 4 which are eventually connected to the Internet 8 through a "front porch" or gateway service 10 such as, for example America-On-Line (AOL), EROLS, COMPUSERVE, or the like. Similarly, the servers 6 may be connected directly to the Internet 8 or may connect to the Internet 8 through a similar gateway service 12. Typically, the gateway 10 acts as a proxy server to cache the most recently requested data retrieved from a content server 6, to control access of the Internet 8 to only authorized clients 4, and to keep track of client usage for billing purposes.

Browsers are by nature graphically intensive and are probably most often used to retrieve text, audio, and pictorial documents and to display the downloaded media for the user's edification or entertainment. Less frequently, browsers are used to provide data to servers, such as providing purchase information or catalog item selection. Browser Web services have enjoyed an unprecedented acceptance by the general public. Recently, personal computers running Web browsers have become indispensilble fixtures in many homes and offices. Therefore, with the ready availability of browser software to the masses, it would be advantageous to find other uses for the browser in addition to searching for and retrieving files for display.

On another track, many system operators view remote control of a Central Processor Complex (CPC) or CPC Sysplex (mainframe computer) as a very important and necessary function. Typically, operators have one or more operations control rooms separate from the data center to manage all the CPCs. The Hardware Management Console (HMC) application represents each hardware object as an icon with various background colors to depict the current state of the object and allows actions to be initiated on objects, using a drag and drop style of operation (see U.S. Pat. No. 5,479,599 to Rockwell et al., herein incorporated by reference). The HMC application is structured in two parts: an interface part and a function execution part. The interface part has the purpose of accepting incoming requests and presenting outgoing results. In a local HMC, the interface part for the user interface implements the drag and drop interaction style. The function execution part has the responsibility for performing the requested action and providing status, without regard to the request source. The interface part and the function execution part communicate using a set of internal messages that are independent of the presentation.

In addition to operations from control centers, system programmers in other locations sometimes need to monitor or manage the CPCs. Further, business travel may require a systems programmer to have remote monitoring and management capability from a hotel room. As we move into the next century and the industry moves towards flexible work locations, some operators or programmers may have a need to monitor and manage CPCs from their home; the office of the 21st century.

Currently, most remote operators and programmers use Distributed Console Access Facility (DCAF) or similar software that provides remote access and control of a computer over either System Network Architecture (SNA) or Transmission Control Protocol/Internet Protocol (TCP/IP) Local Area Networks (LANs) to implement their remote control needs. However, many users have expressed concern over the DCAFs speed and reliability in certain environments. In response to this, Single Protocol enhancements to the Hardware Management Console (HMC) has been developed.

While the single protocol enhancements provide an acceptable solution for some users, others have requested a solution that they can implement on their own workstations. Many have asked for a remote control capability that will co-exist with their other operations applications and on their platform of choice (e.g., Windows, OS/2, etc.). It is therefore desirable to provide a fast and reliable connections, to remotely monitor, control and maintain a remote computer from a personal computer or workstation with coexisting applications.

SUMMARY OF THE INVENTION

It is therefore an object of the present invention to use a standard Web Browser to monitor and control a remote device such as a mainframe computer via the Internet.

It is yet another object of the present invention to provide a Web browser that displays a "home page" from which remote computer operations can be conducted.

It is yet another object of the present invention to provide a pictorial representation or icon representing a remote device where the color of the icon represents the state of the remote device.

It is yet another object of the present invention to allow a local Hardware Management Console (HMC) to reflect changes in a monitored device initiated by a remote web browser.

According to the invention, a personal computer or workstation running a Web browser is used to display and send information related to the operation of a remote computer such as a mainframe. In the preferred embodiment, a web site or "home-page" is constructed on a secure HTTP (hyper text transfer protocol) server which displays a hardware management console (HMC). A user logs on to the Internet in a conventional manner by entering the address or uniform resource locator (URL) to connect to the secure HTTP server at which point additional security such as a password will be required. Upon entry of a correct password the Hardware Management Console (HMC) home-page will be displayed.

Icons representing various mainframe computer components which link to additional pages are displayed from which the user can choose or "click" to obtain more information or complete an HTML form to cause a function to be executed. It is expected that the users will supply one of a variety of currently available Web browsers and that these users will be able to connect to an HMC home page over a local area network (LAN), wide area network (WAN) or switched connection supporting TCP/IP and HTML traffic.

Thus according to the present invention, using a standard Web browser, multiple computer processors and/or other related devices can be simultaneously monitored and controlled from a remote location. The computer processors or devices to be controlled are represented on the Web browser display by icons where the background color of the icons are used to convey the operating state of the device. Also each view displayed by the Web browser contains an image heading or icon depicting the overall state for the complete set of devices. In addition to depicting the state of the complete set of devices, the views displayed by the Web browser also allow the user to perform actions against the devices being depicted by the display. Any action initiated by a remote web browser is reflected on the local Hardware Management Console (HMC) drag and drop interface.

BRIEF DESCRIPTION OF THE DRAWINGS

The foregoing and other objects, aspects and advantages will be better understood from the following detailed description of a preferred embodiment of the invention with reference to the drawings, in which:

FIG. 10 is a screen showing detailed information for a particular CPC icon which was selected from the screen shown in FIG. 9;

DETAILED DESCRIPTION OF A PREFERRED EMBODIMENT OF THE INVENTION

Figure 1:
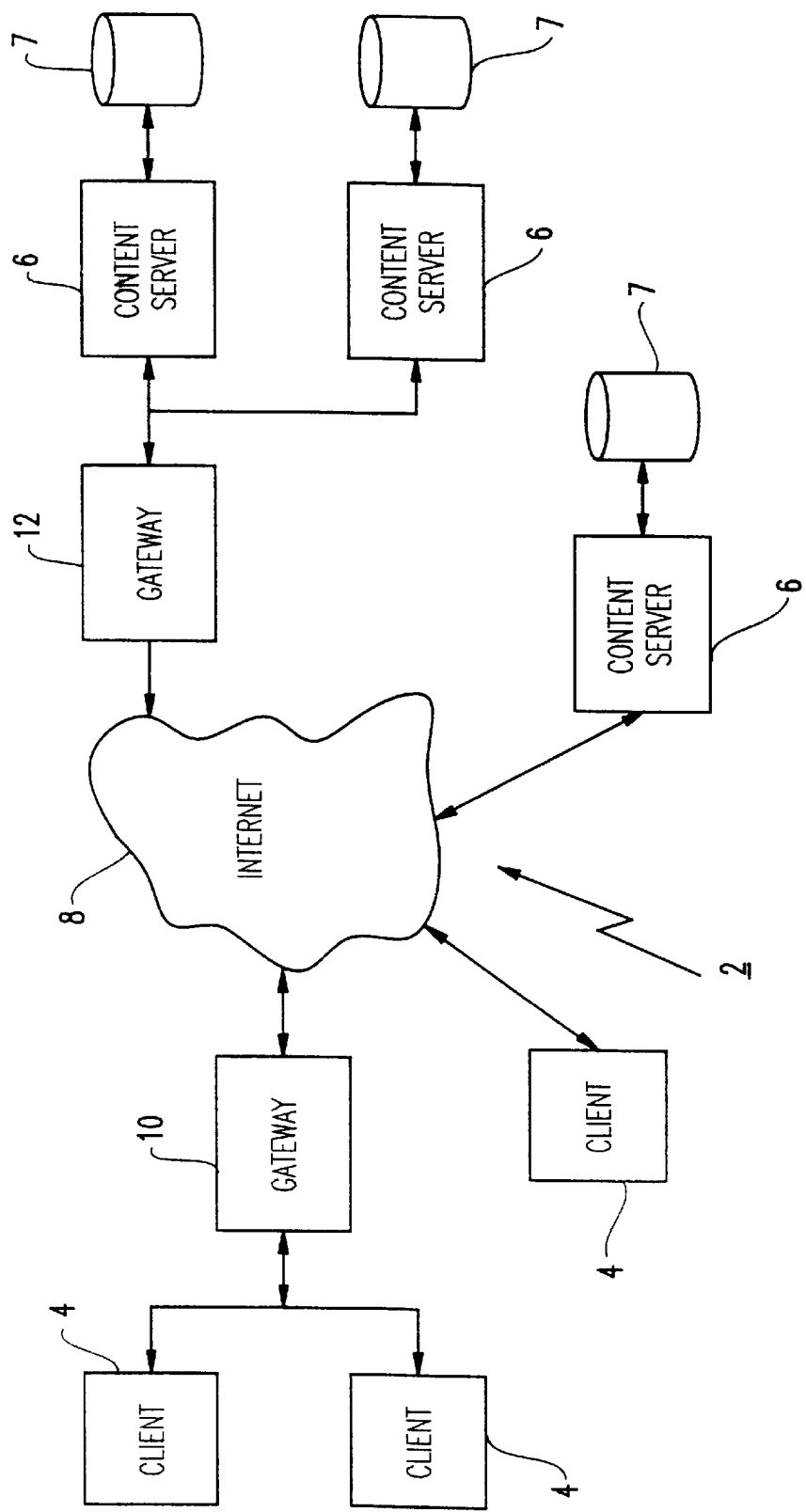
FIG. 1 is a pictorial illustration of the Internet.
Figure 2:
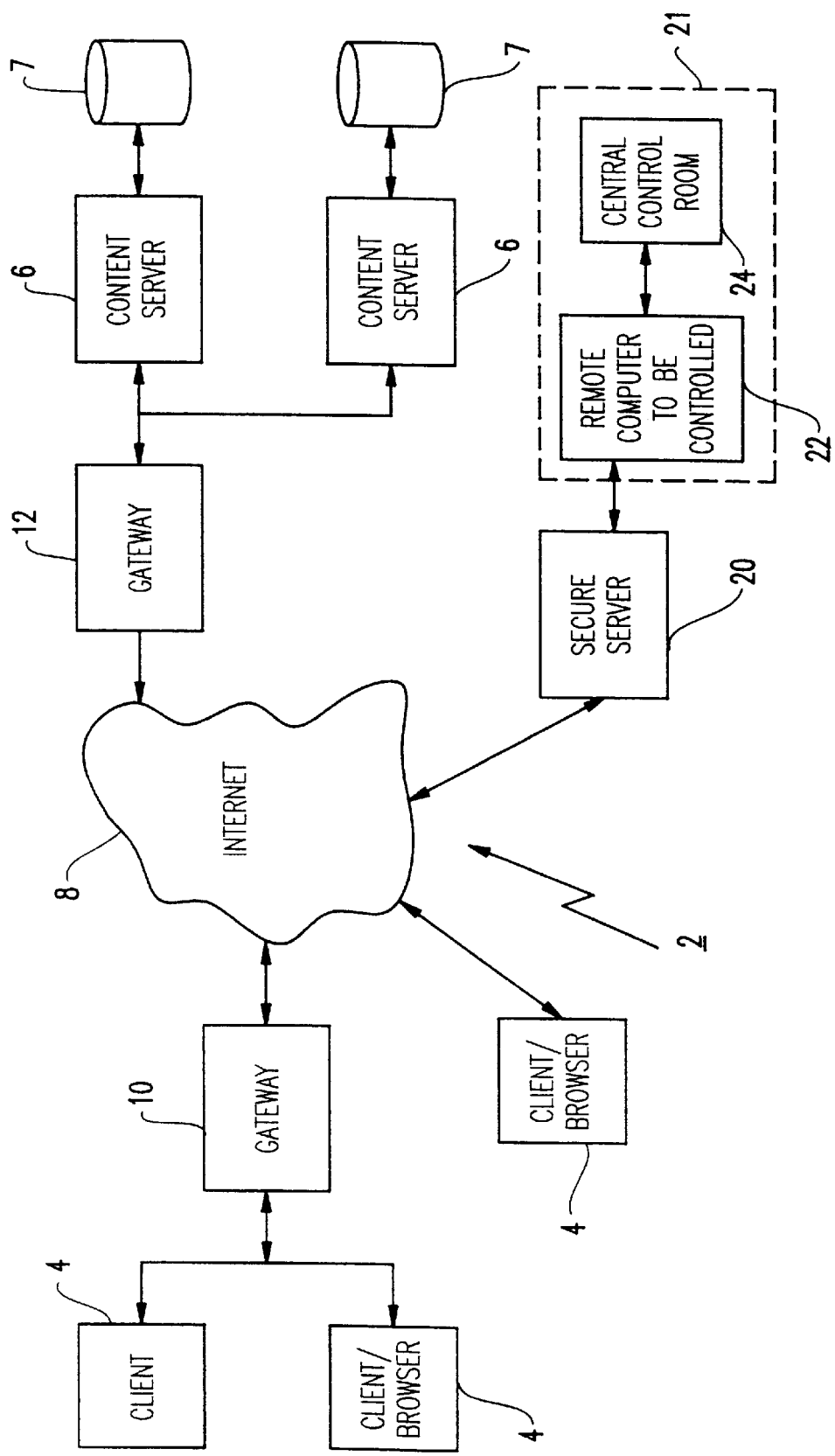
FIG. 2 is a pictorial illustration of the Internet according to the present invention.

Referring now to the drawings, and more particularly to FIG. 2, there is shown a pictorial illustration of the Internet similar to that shown in FIG. 1 with like elements similarly labeled. Conventionally, a computing facility 21 comprising, for example, a mainframe computer system 22, comprising one or more CPCs, is operated from a local Hardware Management Console (HMC) in a central control room 24. The local Hardware Management Console (HMC) typically employs a drag and drop interface as discussed above with reference to U.S. Pat. No. 5,479,599 to Rockwell et al. According to the present invention, in addition to local control via a drag and drop HMC, a client 4 running a standard Web Browser can logon to a secure server 20 in order to monitor and control a remote computing device 22, such a mainframe computer 22, through the Internet from a remote location such as from home, the office, or a hotel room.

With the present invention, using a standard Web browser 4, multiple computer processors and/or other related devices 22 can be simultaneously monitored and controlled from a remote location. The computer processors or devices to be controlled 22 are represented on the Web browser 4 via objects or icons where the background color of the icons are used to convey the operating state of the device. Also each view displayed by the Web browser 4 contains an image heading depicting the overall state for the complete set of computing devices 22.

The invention comprises a Platform Independent Remote Control (PIRC) application which may be customized for individual users. For example, the user is able to customize the PIRC application in a language of choice (e.g., English, Japanese, etc.). Since the user or client 4 will "logon", the secure server 20 will store the language choice based on user identification (userid) and automatically show the data using the language customization information.

The performance characteristics of the remote control connection are most important when the connection will be over slow speed lines. Therefore reasonable response time with line speeds as low as 2400 bps are taken into consideration. Reasonable response times for 2400 bps are about 1 minute for the first screen and 15 to 30 seconds for all following screen updates. Typically, it is expected that the most common low speed connection will be 14.4 kbps which should achieve 15 second or less response times at that speed. In order to approach these response objectives, it is necessary to limit the amount of graphics that are used in the application. Hence, the same icons are used on multiple displays and complex background patterns are avoided.

Monitoring of system status 22 requires periodic refreshes of the display. The refresh period is settable by the user so that it can be tailored to the environment and usual response time. The secure server 20 remembers the refresh rate setting by userid and Internet Protocol (IP) address so that a user can customize refresh rate based on both office and home connections.

As noted above, typically HTTP is platform independent. Hence, common platforms and applications are suitable for the practice of the invention. For example, suitable platforms that are supported are Windows 3.1, Windows 95, Windows NT, and OS/2 Warp. Similarly, common web browsers which are supported are Netscape Navigator 2.x or 3.x, Microsoft Explorer 3.x, and OS/2 Netscape Navigator. Enhanced HTML functions, such as frames may also be used.

An advantage of the remote control scheme of the present invention is the allowability of multiple users connected concurrently. It will be important to maintain the controls that serialize access to the HMC functions and to either queue the requests or return a busy indication as appropriate.

Security is a very important issue. Hence, it is imperative that unauthorized users will always be denied access to this interface. Most common browsers support SSL (secure sockets) which authenticates the server. Some support SHTTP (secure HTTP) which authenticates both the browser and the server.

Platform Independent Remote Control (PIRC) provides most of the functions that are available under the HMC Daily and Recovery HMC tasks, subject to limitations placed on the access rights of that user. PIRC also controls the displayed information and the functional control based on the authority assigned to the user, as identified during the logon process. The user is able to monitor defined CPCs, images, or groups and get the details windows for specific objects. The user is able to view the contents of the exceptions group which will allow the user to easily see which objects are having problems. The user is also able to exercise the following HMC functions: Reset Normal or Clear Start, Stop, Profile Update (for IPL address, IPL Parm, and assign IOCDS (Input Output Control Data Set); Assign the Profile that is to be used by Activate; View Hardware Messages; View operating System Messages; and Issue operator Console requests. The user may also be allowed to view the HMC online documentation. Any HMC function initiated or status change remotely initiated via the web browser will be displayed locally at the local drag and drop HMC and vice-versa.

Figure 3:
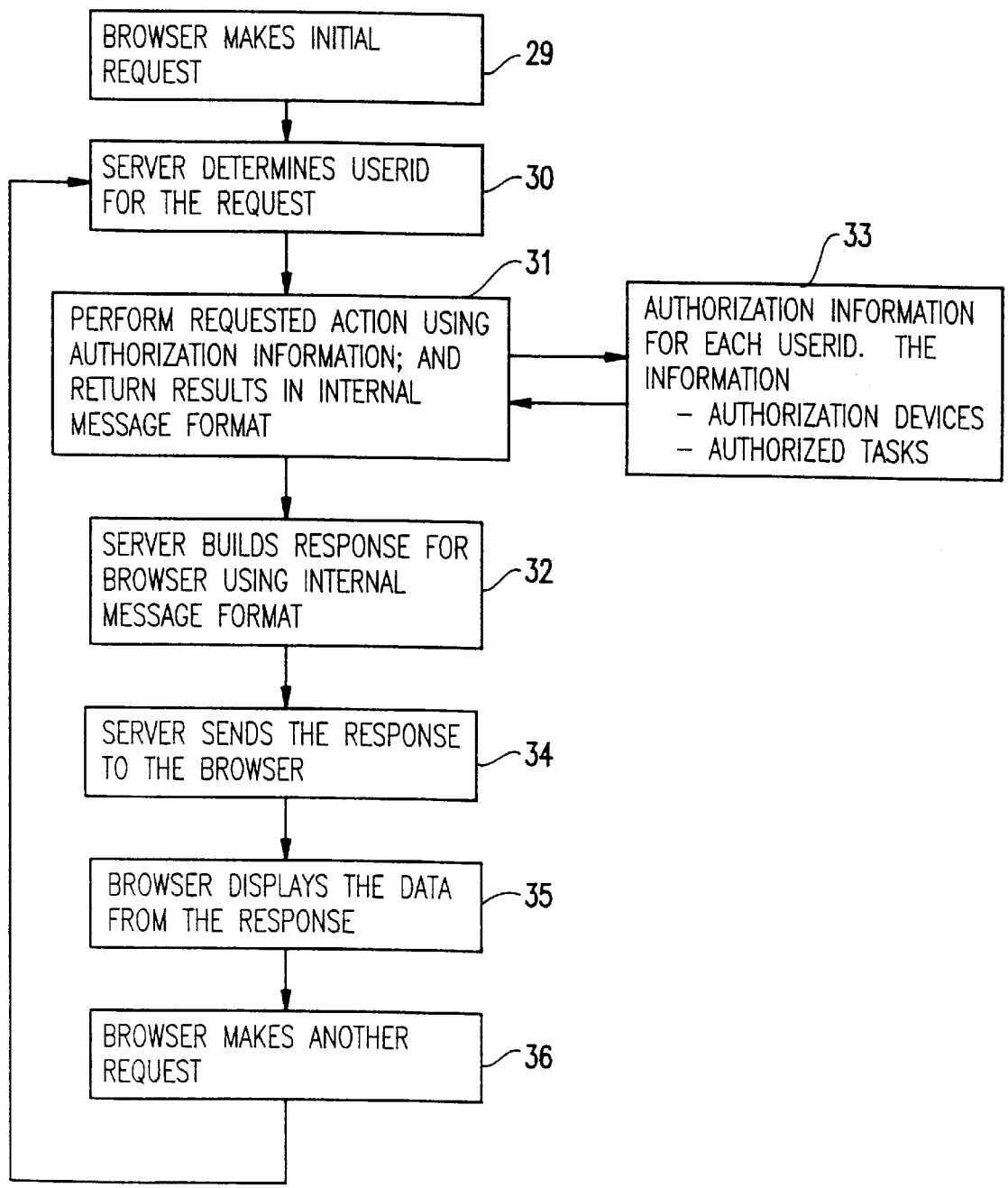
FIG. 3 is a flow diagram showing the process flow for a browser request.

Referring now to FIG. 3 there is shown a flow diagram showing the process flow for a browser request. Starting with box 29, the browser makes an initial request. At box 30, the server determines the user identification (userid) for the request. At Box 31, the server converts the browser request to the internal message necessary to initiate the desired action (this simulates the drag and drop user interface of the local HMC). Further, at box 32, the HMC function part processes the request, using a list of authorized devices and actions for each user id at 33 and returns an internal message with results. At Box 32, the server builds an HTML response for the browser, using the information from the internal message returned from Box 31 and the response is sent to the browser at box 34. The browser displays the data from the server on a computer screen at box 35 whereupon the user can click on a displayed icon or action button to initiate another browser request to the server at box 36.

Figure 4:
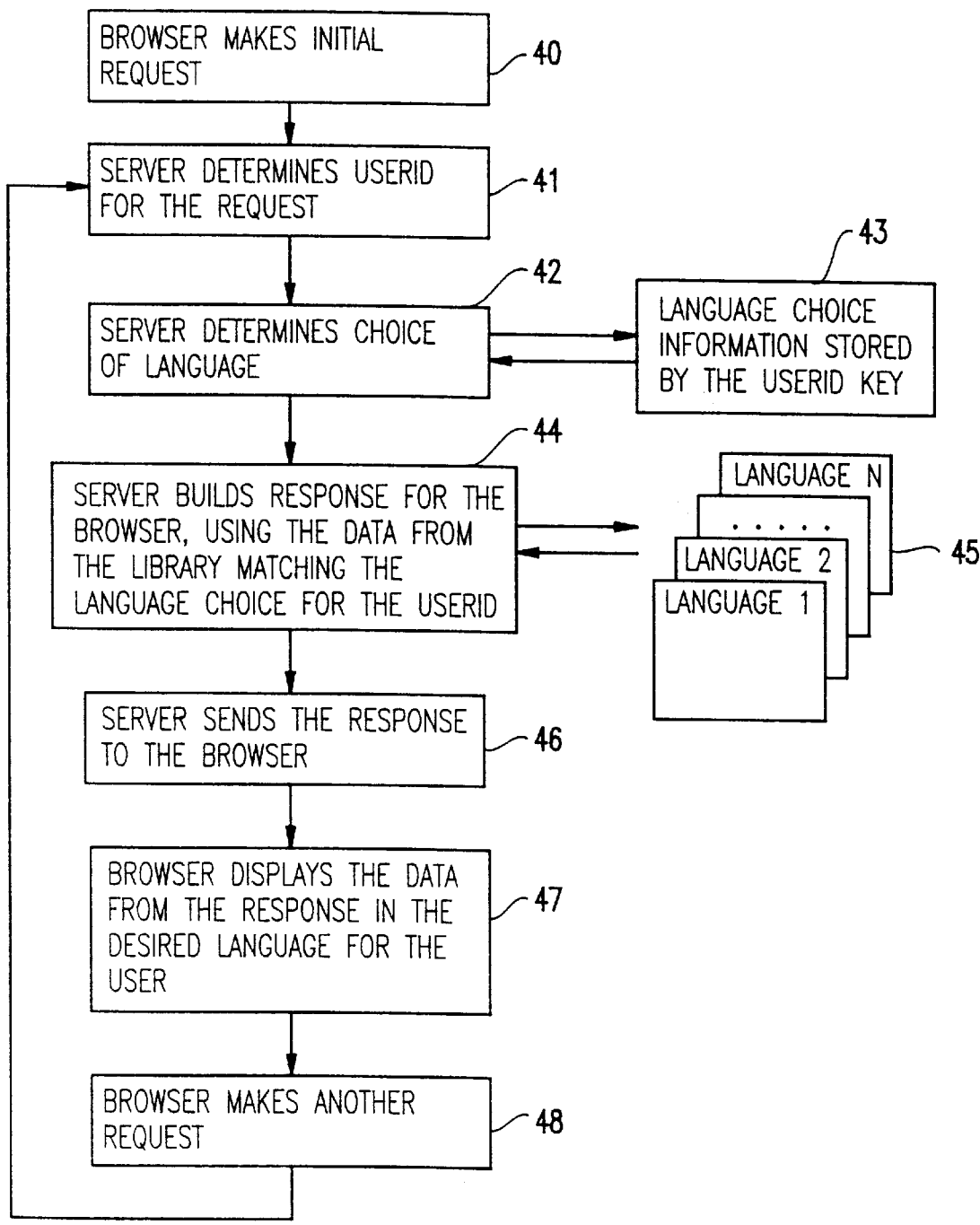
FIG. 4 is a flow diagram showing the personalized choice of language.

As noted above, different users may prefer the data to be displayed in a selected language. Referring to FIG. 4, the browser makes an initial request at box 40 and the server determines the userid for the request at 41. At box 42 the server determines the choice of language from a language selection previously stored for the userid at 43. At box 44, the server builds a response for the browser using data from a language library 45. The server then sends the response to the browser 46 which is displayed for the user in the language of choice 47. The user can click on a displayed icon or action button to initiate another browser request to the server at 48 and the process continues.

Figure 5:
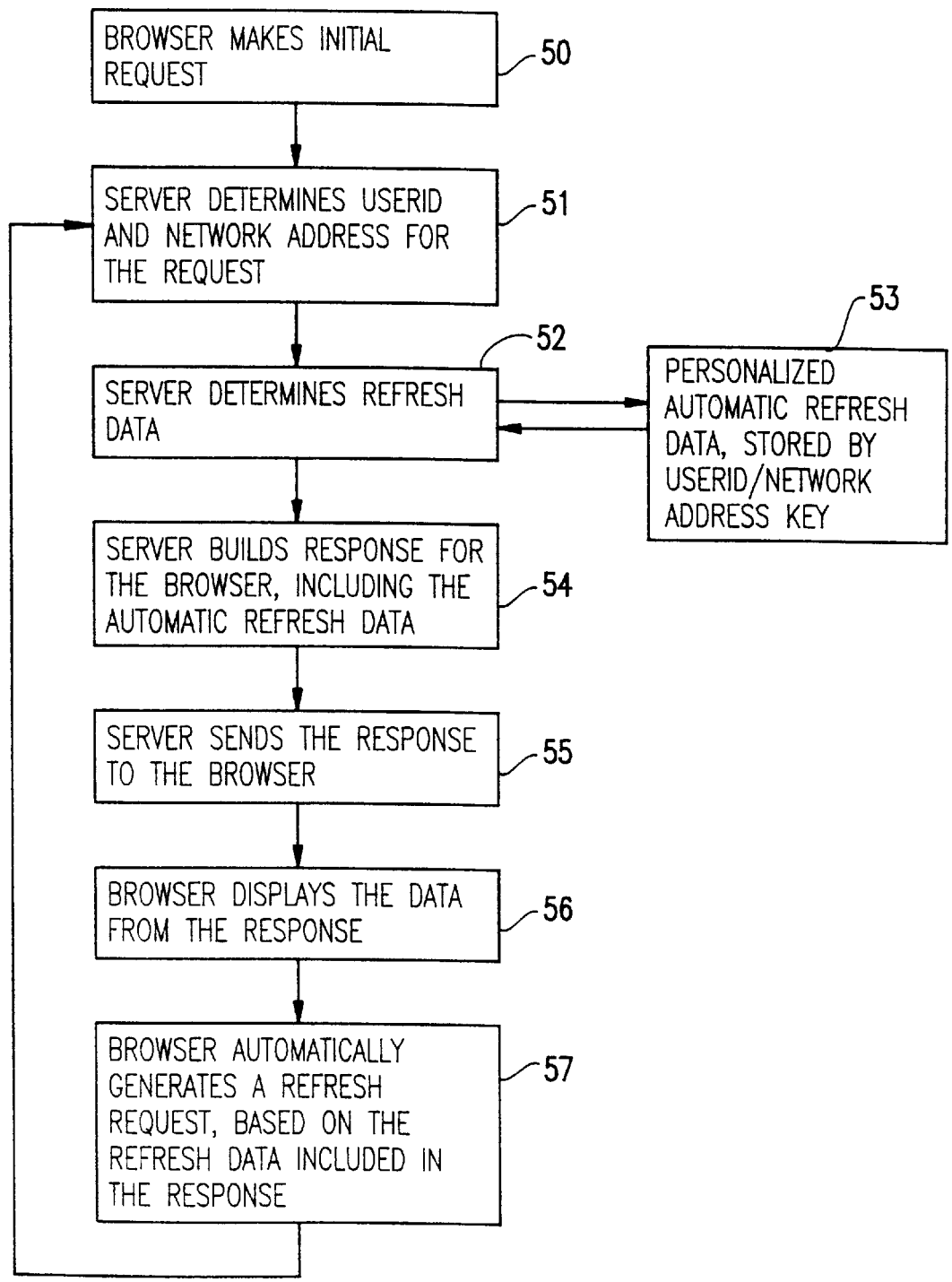
FIG. 5 is a flow diagram showing the automatic browser refresh process.

Referring now to FIG. 5, there is shown a procedure for using the personalized refresh of the browser screen. In box 50, the browser makes an initial request. At box 51 the server determines the userid and the network address for the request. At 52, the server determines the refresh data from the personalized automatic refresh data stored by the server at box 53 by userid and network address key. Based on the refresh data at 53, the server builds a response for the browser at 54 and sends the response, including the automatic refresh data to the browser 55 where it is displayed at 56. Thereafter, at box 57, the browser automatically generates a refresh request based on the refresh data included in the response.

FIGS. 6 through 16 show examples of various screens displayed on a personal computer or workstation running a Web browser related to the operation of a remote computer such as, in this example, an s/390 mainframe.

Figure 6:
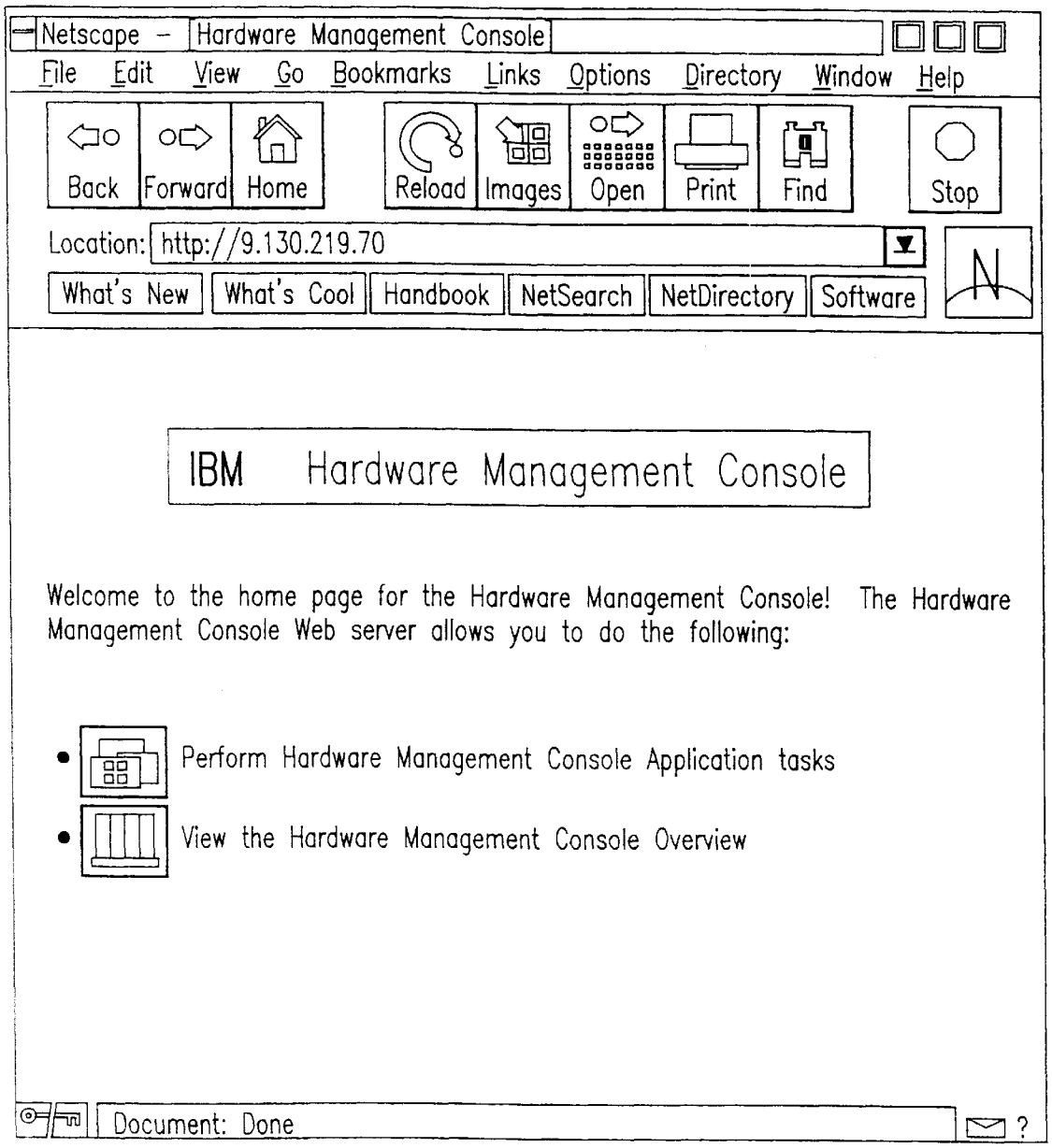
FIG. 6 is a sample home-page for the Hardware Management Console (HMC) according to the present invention.
Figure 7:
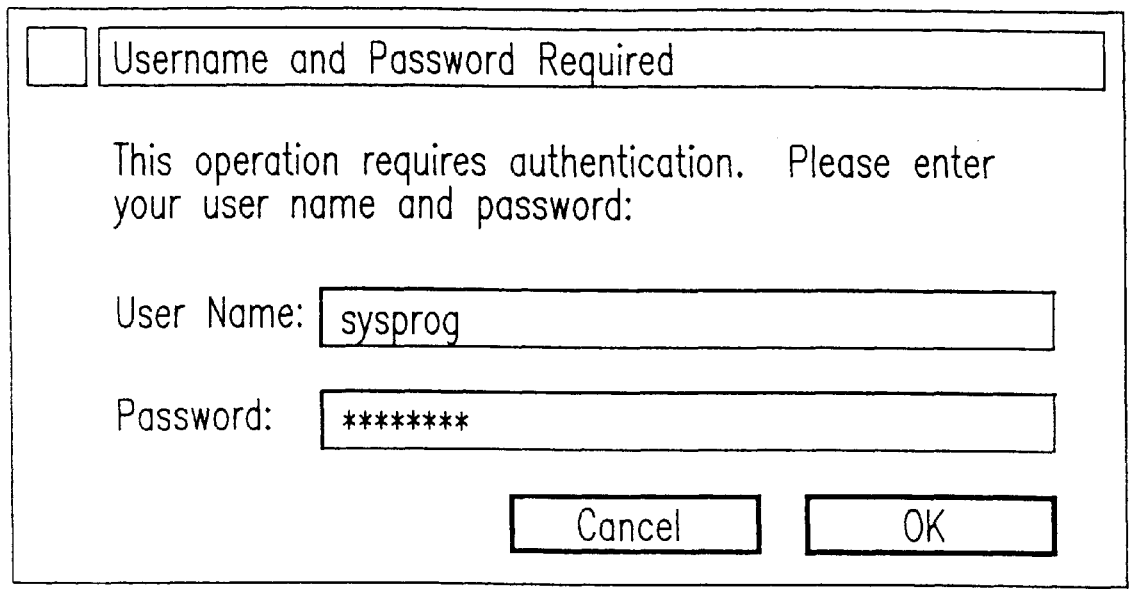
FIG. 7 is a sample password screen.

Referring to FIG. 6, there is shown a "home-page" or starting point page stored on a secure server and displayed on the browser screen titled "Hardware Management Console" offering a couple of exemplary choices. Specifically, "Perform Hardware Management Application Tasks" and "View the Hardware Management Overview" are shown. Clicking on one of these choices or icons prompts a security screen shown in FIG. 7 to be displayed. Upon entry of a correct user name and password, the secure server will build and send the appropriate response screen to the browser.

Figure 8:
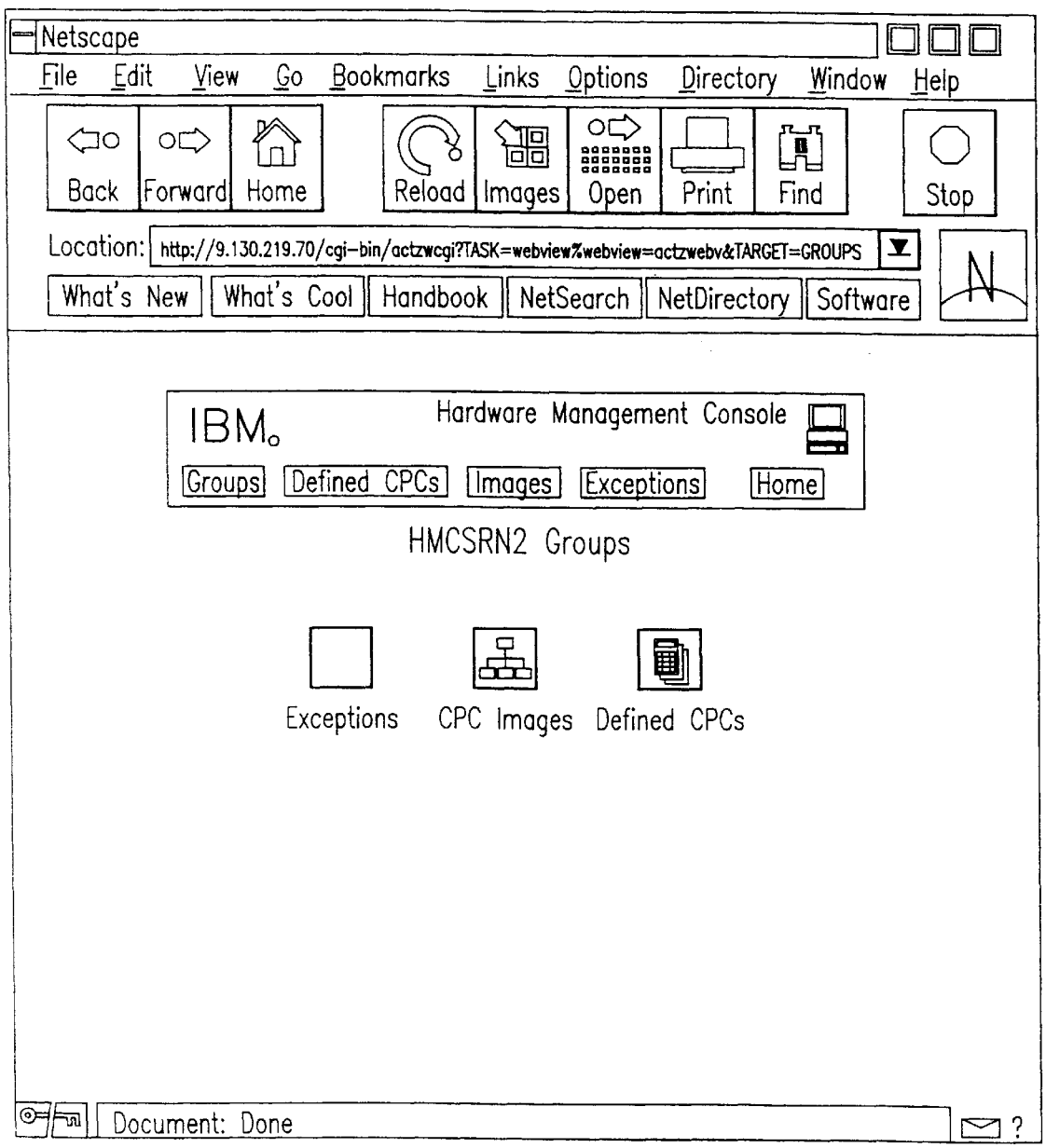
FIG. 8 is a Hardware Management Console (HMC) browser screen where the color of the banner indicates the status summary (e.g., green—everything is OK; red—something is abnormal)

Clicking on the "Hardware Management Console Application Tasks" of FIG. 6 causes the screen shown in FIG. 8 to be displayed. The color of the "Hardware Management Console" banner across the top of the screen indicates a summary status. That is, if the banner is green, this indicates to the user that all monitored systems are normal. If, on the other hand, the banner is red, this indicates that something is abnormal. Each icon displayed under the banner represents a hardware view or an operating system view for the mainframe. Likewise, the background color of these icons indicates the summary status of the associated system and the availability of messages relating to hardware or operating system.

Figure 9:
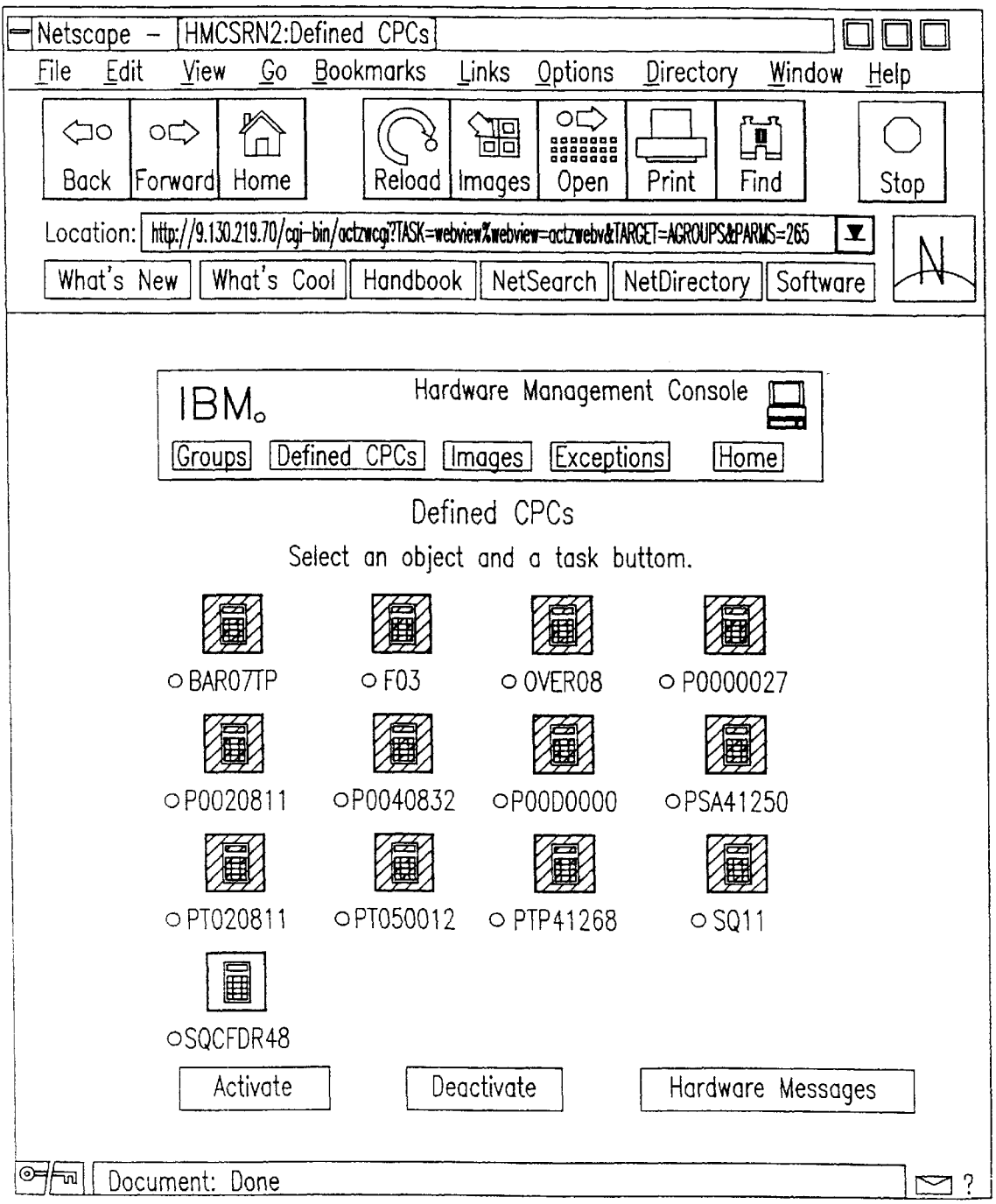
FIG. 9 is a screen displaying icons representing multiple central processing complexes(i.e, mainframe computers) and their status and message availability.

Clicking on the "define CPC" icon in FIG. 8 links to and loads the screen shown in FIG. 9 which displays icons representing CPCs (Central Processing Complex for S/390 Mainframe) Again, the background color of the individual CPC icons indicates the summary status of the associated hardware and availability of messages. For example, green indicates that the hardware is operating normally, red abnormally and blue indicates that messages are available. Of course other colors may also be used to give an immediate indication to the user of other conditions.

Referring now to FIG. 10, clicking on a CPC of FIG. 9 loads a screen to the browser showing more detailed information useful to the operator such as, for example, Instance Information, Last Task Information, Acceptable Status, and Product Information. In this example the icon for "F03 Details" has been selected.

Figure 11:
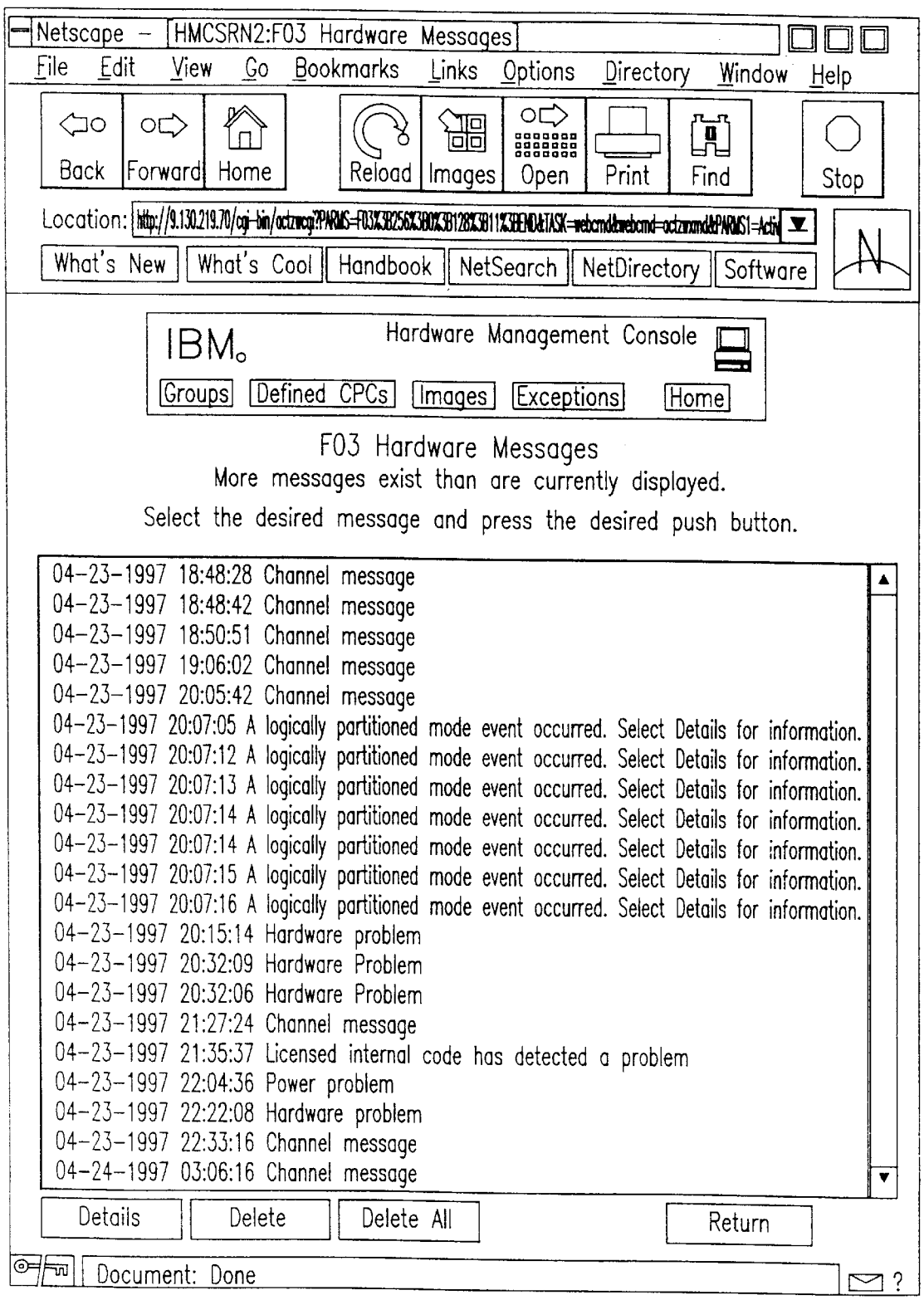
FIG. 11 is a screen showing a list of hardware messages by clicking on the "hardware messages" button in FIG. 9.
Figure 12:
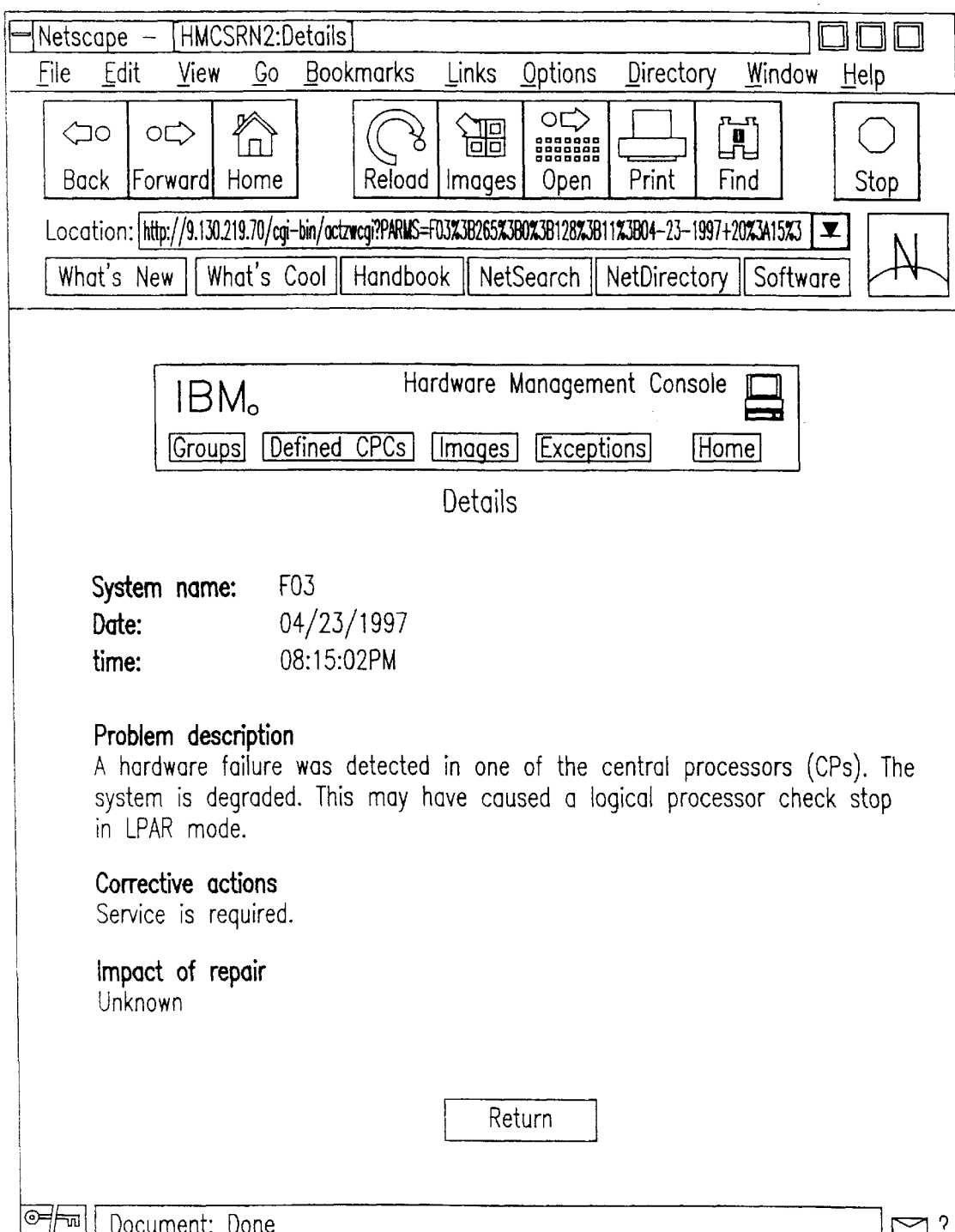
FIG. 12 is a screen showing the results of clicking the "Details" button in FIG. 11.

Similarly, FIG. 11 shows "F03 Hardware Messages" displayed by selecting the radio button under the F03 icon and clicking on the "Hardware Messages" button of FIG. 9. The screen gives the date, time, and a hardware message associated therewith. FIG. 12 shows the results of clicking on the "Details Button" shown in FIG. 11 which displays a screen offering a more detailed analysis of a specific hardware problem. The details may include such data as system name, date, time, Problem Description, Corrective Actions, and Impact of Repair.

Figure 13:
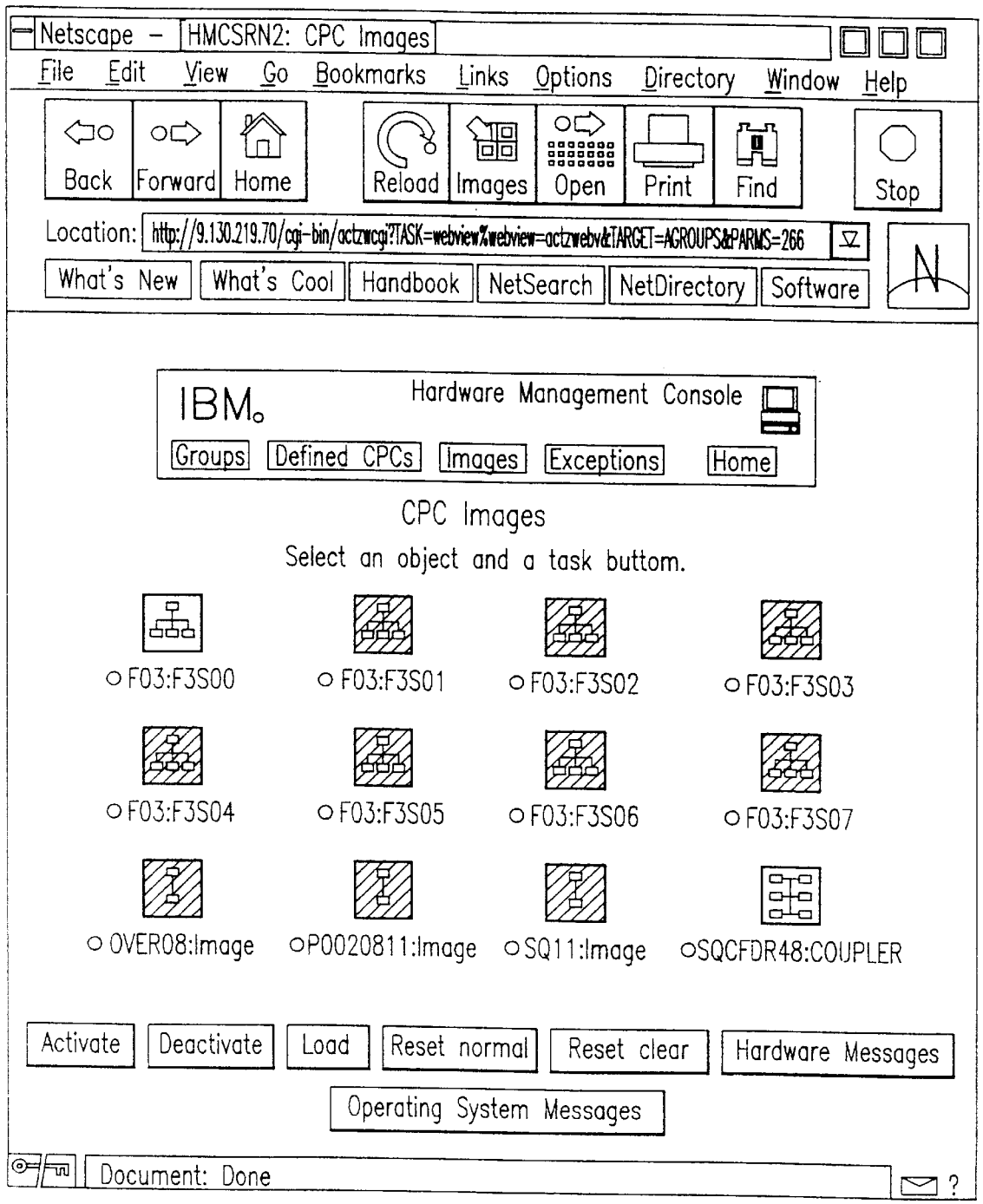
FIG. 13 is a screen showing CPC image icons, each representing a mainframe S/390 operating system where each icon background color represents the operating system status and the availability of the operating messages.
Figure 14:
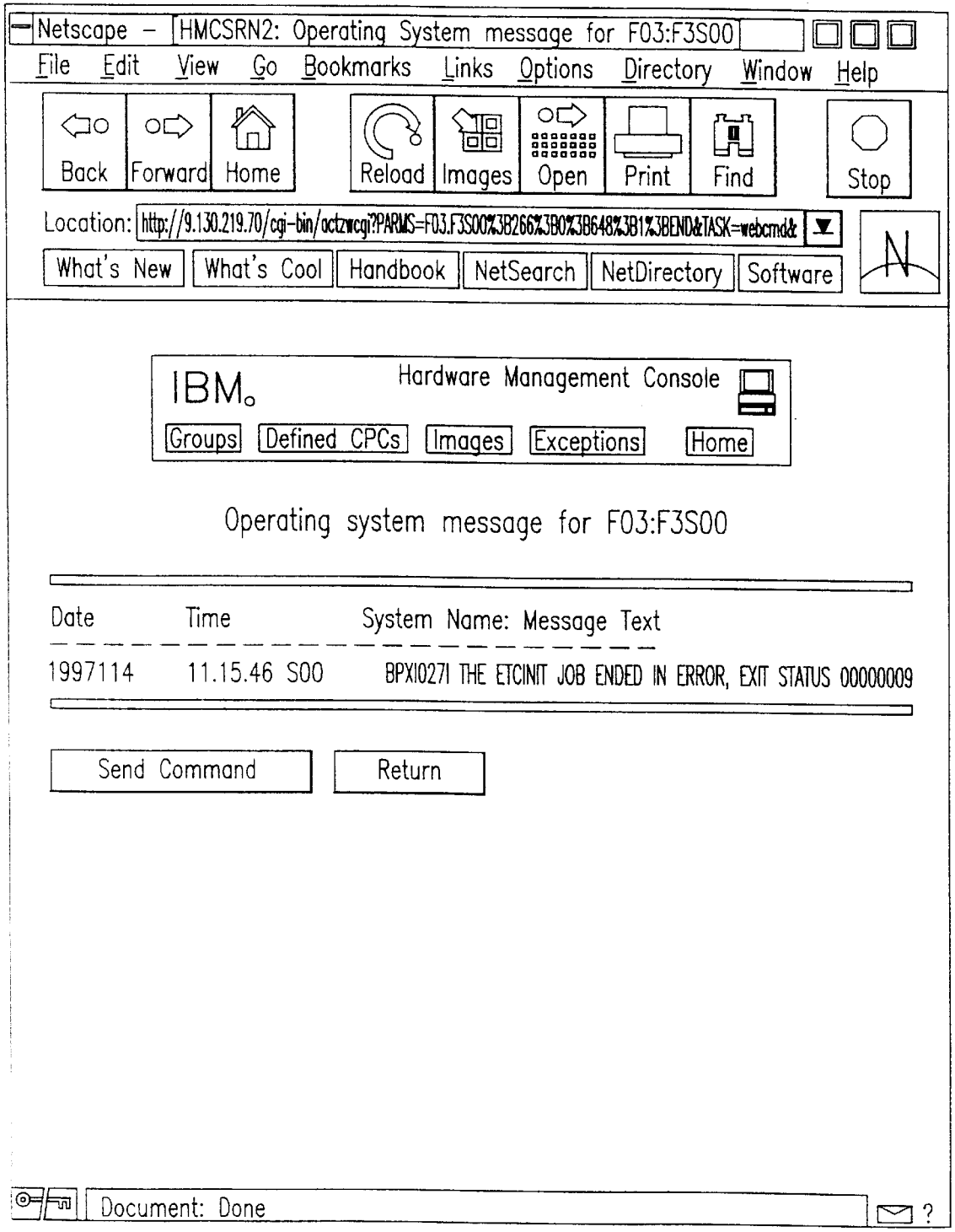
FIG. 14 is a screen showing the results of clicking on the "operating system messages" button in FIG. 13.

Referring now to FIG. 13, there is shown a browser page having a plurality of CPC image icons, each representing a S/390 Operating System. The background color of each icon represents the status and the availability of operating messages. For example, FIG. 14 shows the results of selecting the radio button under the P03:F3S00 icon and clicking on the operating system message button. The browser displays for the user the date, time, system name, and message text for the P03:F3S00 operating system.

Figure 15:
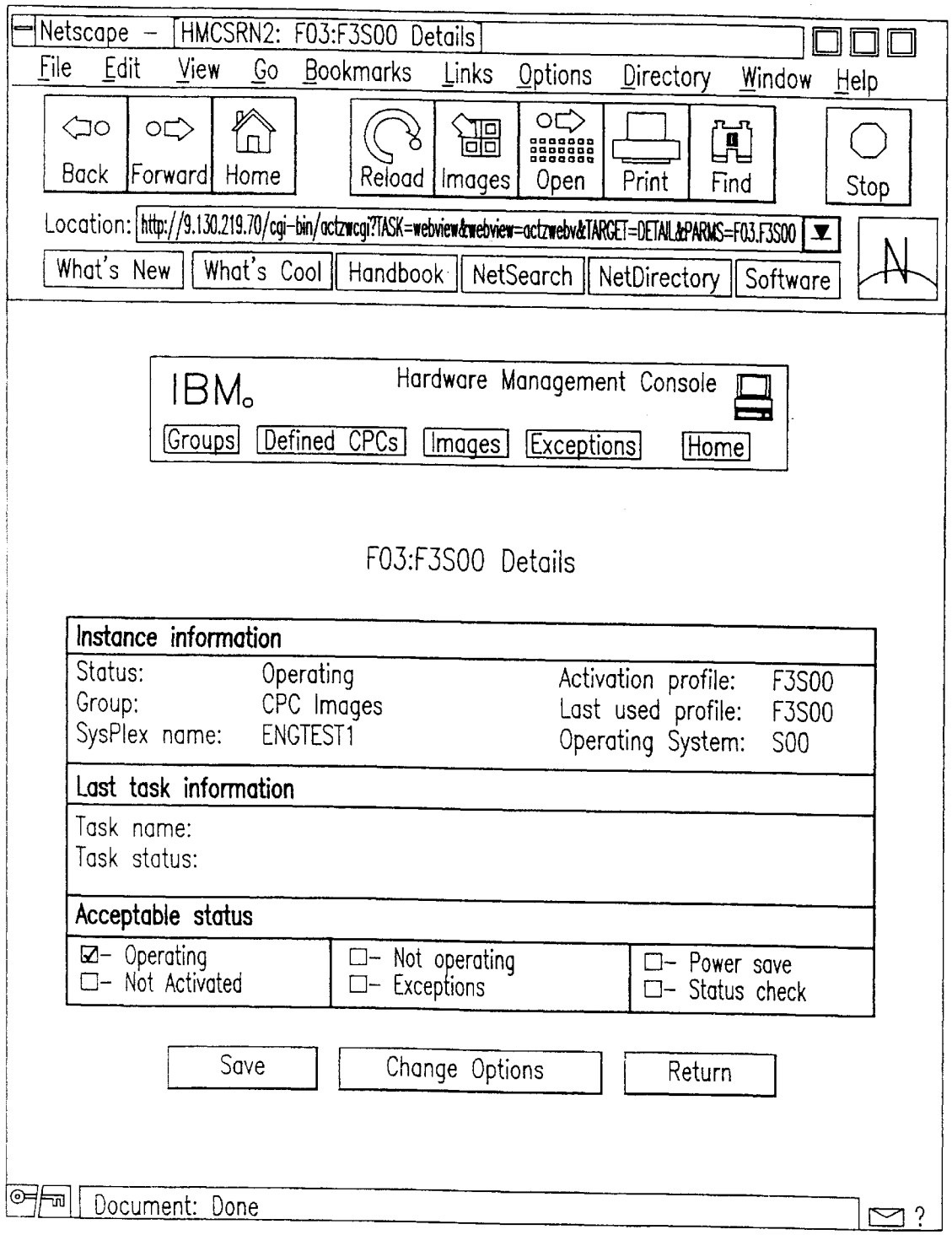
FIG. 15 is a screen showing the results of clicking on a CPC image icon showing detailed information such as the sysplex name.

FIG. 15 shows a browser screen sent from the server when the CPC icon P03:F3S00 from FIG. 13 is clicked. The screen displays such data as Instance Information, Last Task Information, and Acceptable Status for the user.

Figure 16:
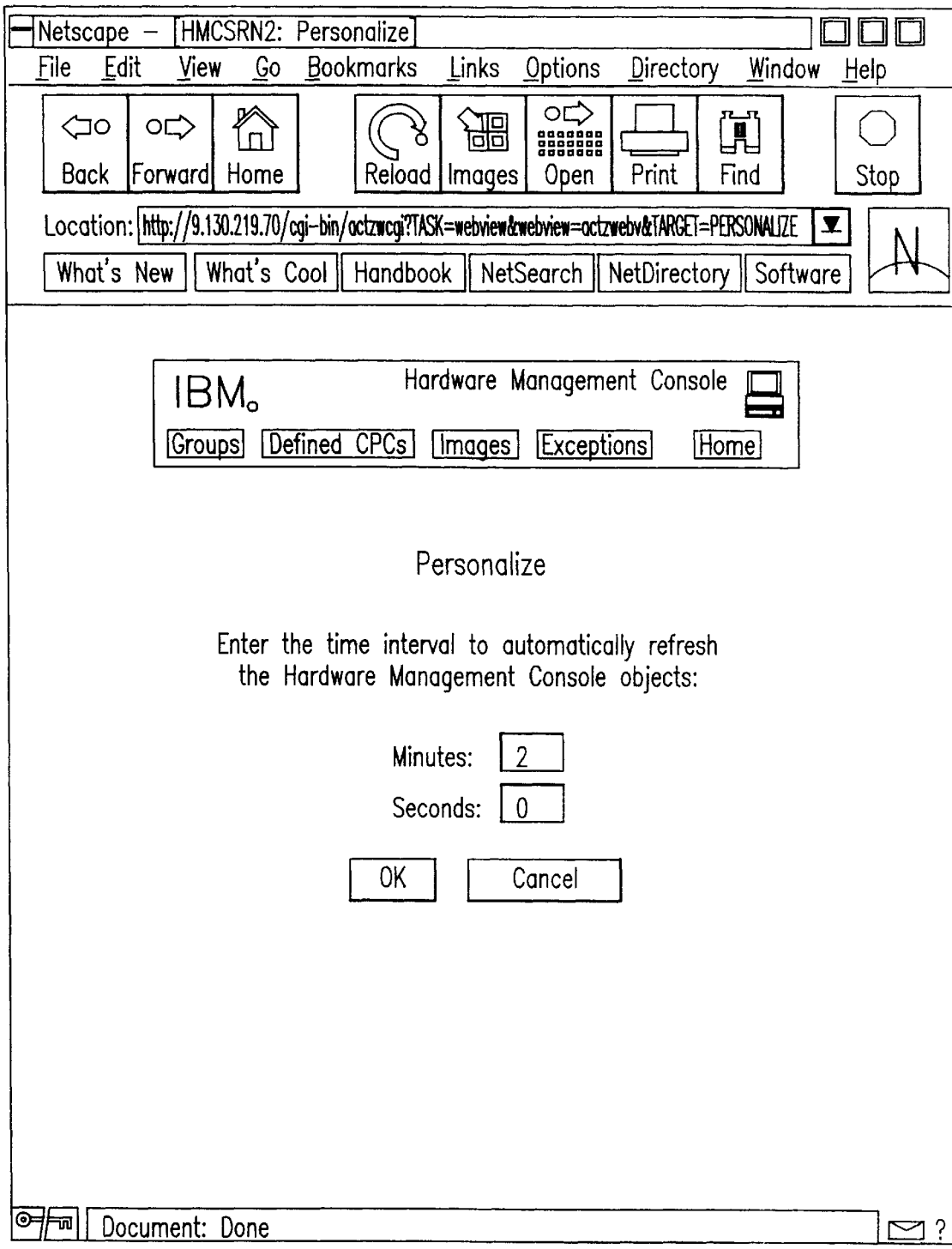
FIG. 16 is a screen showing the results of clicking on the personalize area of the banner which allows the user to change the automatic refresh rate stored at the server for a particular user ID.

Finally, by way of example, FIG. 16 show the results of clicking on the personalize area of the banner shown across the top of the banner screen. As explained with reference to the flow diagram of FIG. 5, the refresh period is settable by the user so that it can be tailored to the environment and usual response time. The secure server remembers the refresh rate setting by userid and IP address so that a user can customize refresh rate based on both office and home connections.

Thus according to the present invention, using a standard Web browser, multiple computer processors and/or other related devices can be simultaneously monitored and controlled from a remote location via the Internet and standard browser software.

While the invention has been described in terms of a single preferred embodiment, those skilled in the art will recognize that the invention can be practiced with modification within the spirit and scope of the appended claims.

We claim:

1. A method for remotely controlling a computing device via the Internet, comprising steps of:

accessing the Internet with a computer terminal running a web browser;

logging onto a server connected to the Internet and to a computing device to be controlled;

verifying a user name and password for said computer terminal running said web browser;

sending home page data from said server to said computer terminal running said web browser, said home page comprising a management console for said computing device to be controlled; and providing icons on said home page representative of components for said computing device to be controlled which link to additional pages containing additional data regarding said representative components, wherein said icons are color coded according a status of said representative components.

2. A method for remotely controlling a computing device via the Internet as recited in claim 1 wherein when an icon comprises a first color said representative component is normal, and when said icon comprises a second color said representative component is abnormal, and when icon comprises a third color messages from said representative component are displayed when said icon is selected.

3. A method for remotely controlling a computing device via the Internet as recited in claim 1 wherein said computing device is a mainframe computer.

4. A method for remotely controlling a computing device via the Internet as recited in claim 1 further comprising the step of building a response to said computer terminal running said web browser authorizing access to only authorized devices and tasks associated with said computing device to be controlled.

5. A method for remotely controlling a computing device via the Internet as recited in claim 1 further comprising the step of choosing a language for data sent from said server to be displayed on said computer terminal running said web browser.

6. A method for remotely controlling a computing device via Internet as recited in claim 1 further comprising the steps of:

storing a personalized browser refresh time interval on said server;

building an initial response for said server and sending said browser refresh time interval to said computer terminal running said web browser; and automatically generating a refresh request by said browser.

7. A system for remotely controlling a remote computer via the World Wide Web, comprising:

at least a first client running browser software;

an Internet connection for connecting said first client to the World Wide Web; and a secure server connected to the World Wide Web and connected to a remote computer to be controlled, wherein said first computer accesses said secure server via the World Wide Web and said secure server sends home-page data to be displayed on said first client comprising a management console for monitoring and controlling said remote computer, wherein said management console comprises icons representative of components for said remote computer which link to additional pages containing more data regarding said representative components, wherein when an icon comprises a first color said representative component status is normal, and when said icon comprises a second color said representative component status is abnormal.

8. A system for remotely controlling a remote computer via the World Wide Web as recited in claim 7 wherein said remote computer is a mainframe computer.

9. A system for remotely controlling a remote computer via the World Wide Web as recited in claim 7 wherein said first client transmits a user identification and password to said secure server.

10. A system for remotely controlling a remote computer via the World Wide Web as recited in claim 9 wherein said secure server stores a language choice for said user identification.

11. A system for remotely controlling a remote computer via the World Wide Web as recited in claim 9 wherein said secure server stores a personalized browser refresh time which is sent to said first client such that said first client can automatically request a refresh according to said personalized browser refresh time.

12. A method for remotely controlling a computing device via a network, comprising steps of:

accessing the network with a computer terminal running browser software;

logging onto a server connected to the network and to a computing device to be controlled;

verifying a user name and password for said computer terminal running said browser software;

sending home page data from said server to said computer terminal running said browser software, said home page comprising a management console for said computing device to be controlled; and providing icons on said home page representative of components for said computing device to be controlled which link to additional pages containing more data regarding said representative components, wherein said icons are color coded according to a status of said representative components.

13. A method for remotely controlling a computing device via a network as recited in claim 12 wherein said network is a local area network.

14. A method for remotely controlling a computing device via a network as recited in claim 12 wherein said network is a wide area network.

15. A method for remotely controlling a computing device via a network as recited in claim 12 wherein said network is switched connection.

16. A method for remotely controlling a computing device via a network as recited in claim 12, wherein when an icon is a first color said representative function is normal, and when said icon is a second color said representative function is abnormal.

* * * * *

UNITED STATES PATENT AND TRADEMARK OFFICE
CERTIFICATE OF CORRECTION

| | | |
|---|---|---|
| PATENT NO. | : 6,138,150 | Page 1 of 1 |
| APPLICATION NO. | : 08/923105 | |
| DATED | : October 24, 2000 | |
| INVENTOR(S) | : Stephen R. Nichols, Kurt N. Schroeder and Samuel L. Wentz | |

It is certified that error appears in the above-identified patent and that said Letters Patent is hereby corrected as shown below:

On Column 8, Line 34, please change "first computer" to --first client--.

Signed and Sealed this

Twenty-second Day of January, 2008

JON W. DUDAS
*Director of the United States Patent and Trademark Office*